May 26, 1959 E. G. PERRY 2,888,310
RECORDER
Filed Nov. 2, 1953 13 Sheets-Sheet 1

INVENTOR.
Edward G. Perry
BY Stevens, Davis, Miller and Mosher
ATTORNEYS

May 26, 1959  E. G. PERRY  2,888,310
RECORDER
Filed Nov. 2, 1953  13 Sheets-Sheet 4

INVENTOR
Edward G. Perry
BY Stevens, Davis, Miller & Mosher
ATTORNEYS

May 26, 1959  E. G. PERRY  2,888,310
RECORDER
Filed Nov. 2, 1953  13 Sheets-Sheet 5

INVENTOR
Edward G. Perry

BY Stevens, Davis, Miller & Mosher
ATTORNEYS

May 26, 1959

E. G. PERRY 2,888,310

RECORDER

Filed Nov. 2, 1953

INVENTOR

Edward G. Perry

BY Stevens, Davis, Miller and Mosher
ATTORNEYS

May 26, 1959  E. G. PERRY  2,888,310
RECORDER
Filed Nov. 2, 1953  13 Sheets-Sheet 8

INVENTOR
Edward G. Perry
BY Stevens, Davis, Miller and Mosher
ATTORNEYS

May 26, 1959  E. G. PERRY  2,888,310
RECORDER
Filed Nov. 2, 1953  13 Sheets-Sheet 9

INVENTOR
Edward G. Perry
BY
Stevens, Davis, Miller & Mosher
ATTORNEYS

May 26, 1959

E. G. PERRY 2,888,310

RECORDER

Filed Nov. 2, 1953

INVENTOR
Edward G. Perry

BY Stevens, Davis, Miller and Mosher
ATTORNEYS

May 26, 1959  E. G. PERRY  2,888,310
RECORDER
Filed Nov. 2, 1953  13 Sheets-Sheet 11
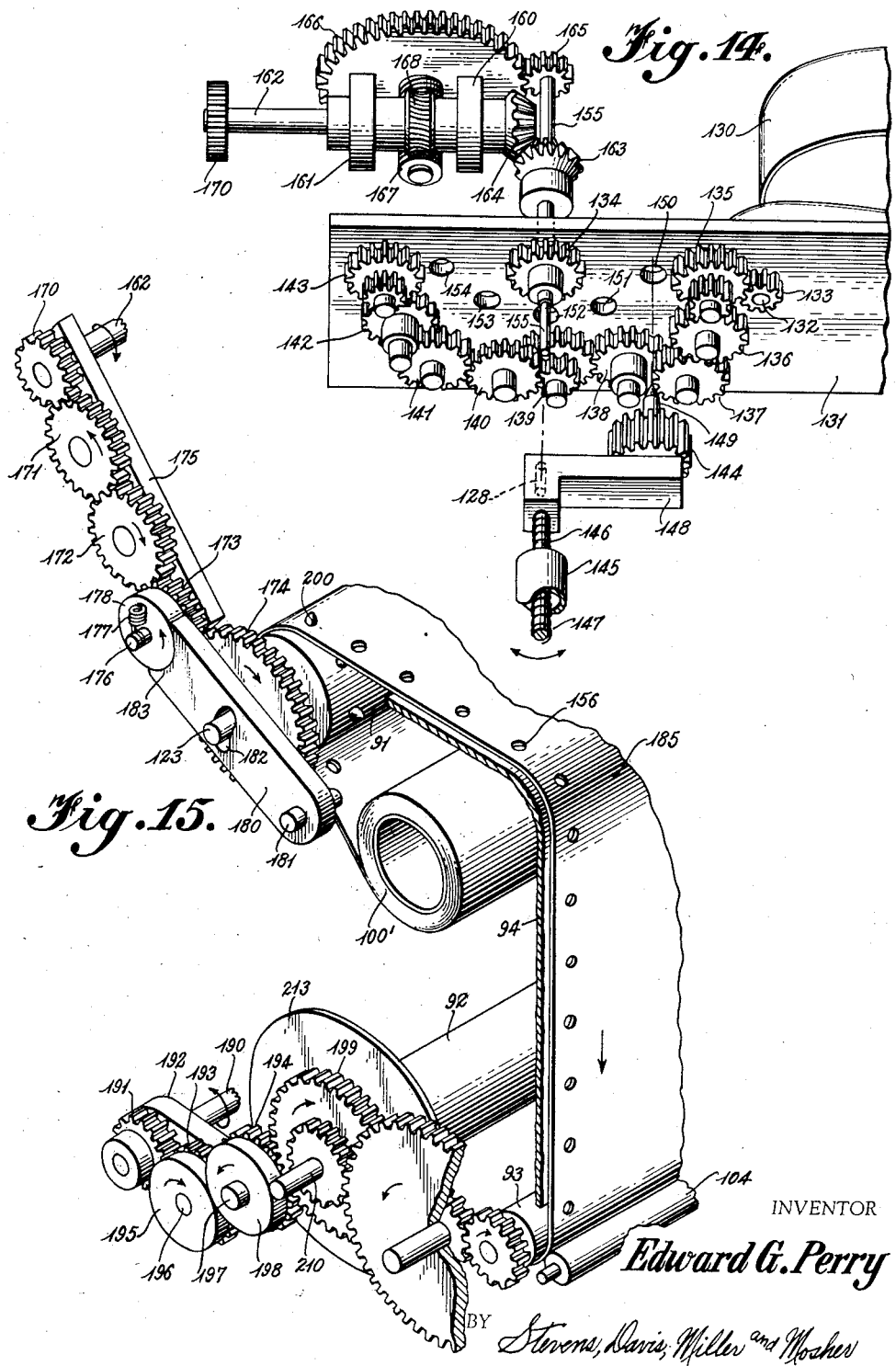
INVENTOR
Edward G. Perry
BY Stevens, Davis, Miller and Mosher
ATTORNEYS May 26, 1959  E. G. PERRY  2,888,310
RECORDER Filed Nov. 2, 1953  13 Sheets-Sheet 12

INVENTOR
*Edward G. Perry*

BY *Stevens, Davis, Miller and Mosher*
ATTORNEYS

May 26, 1959 E. G. PERRY 2,888,310
RECORDER
Filed Nov. 2, 1953 13 Sheets-Sheet 13
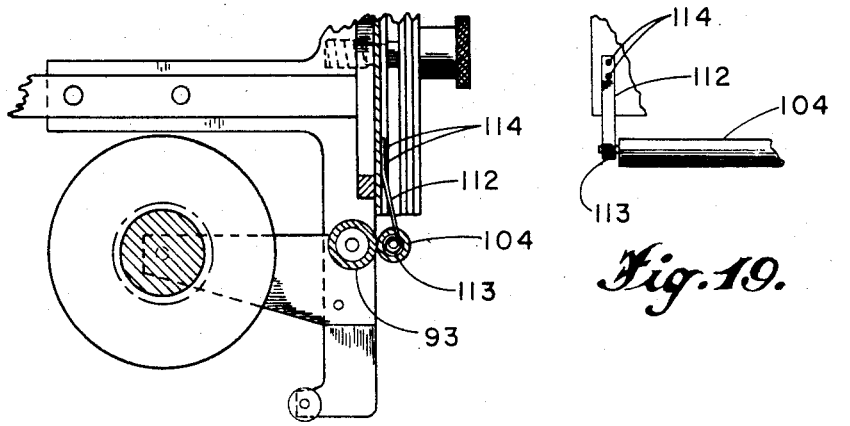
Fig.19.
Fig.18.
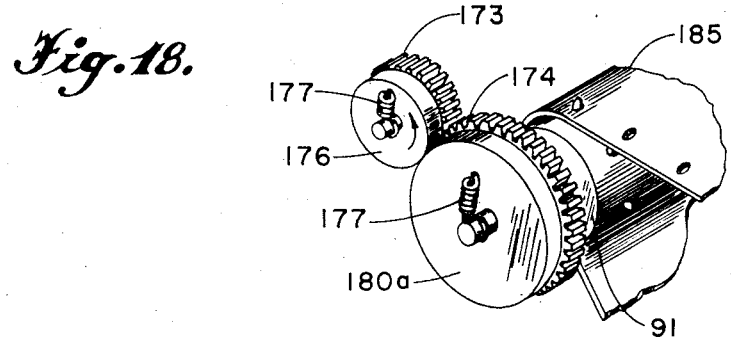
Fig.20.
Fig.21.
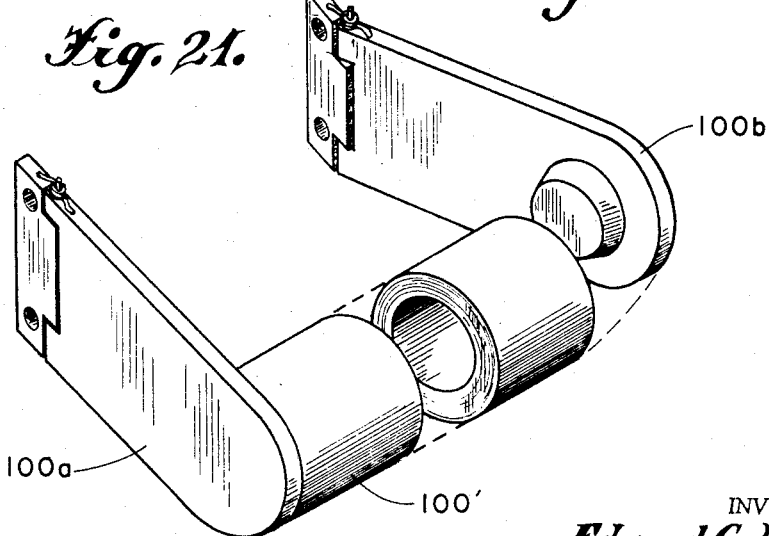
INVENTOR.
Edward G. Perry
BY
Stevens, Davis, Miller & Mosher
ATTORNEYS United States Patent Office 2,888,310
Patented May 26, 1959

2,888,310

RECORDER

Edward Gordon Perry, Dallas, Tex., assignor to Texas Instruments Incorporated, Dallas, Tex., a corporation of Delaware Application November 2, 1953, Serial No. 389,690

27 Claims. (Cl. 346—114)

This invention relates to a recording apparatus.

Meter movements for measuring small currents accurately generally depend on electromagnetic effects for their operation. One such mechanism for movements of this type is the well known permanent-magnet moving-coil mechanism. The mechanism consists of a coil of wires suspended between the poles of a permanent magnet, an air gap on either side of the coil, and a restoring spring. Either an indicator arm or recorder pen can be attached to the coil. When a current is passed through the coil, it deflects in proportion to the strength of the current.

A variation of the above mechanism results when the permanent magnet is replaced with two field coils. The current is passed through the field coils instead of the suspended coil, and the flux produced reacts to develop a torque as in the permanent magnet type. In order for meter movements of this type to follow rapid variations of low current with accuracy, they must be light and delicately mounted. While the above-described meter movements or similar types are successful for many applications, they are not suitable for all applications.

There yet remains a need for a meter movement that will be of universal application, produce a greater torque or power output than current input, respond very rapidly to changes in current direction, have a linear torque output in relation to current input, and be comparatively rugged to enable its use under adverse conditions and not solely to vibration-free and stationary installations. Further there is still a need for a meter movement the accuracy of which will be substantially unaffected by its conditions of use.

By the present invention, a recorder is supplied that will meet the above-enumerated needs of this art. Accordingly, it is an object of the present invention to provide a recorder of universal application that will produce a greater torque or power output than current input.

It is a further object of the present invention to provide a comparatively rugged recorder movement that will respond quickly and accurately to changes of magnitude and direction of the input current and will have a linear torque output in relation to current input.

It is a still further object of the present invention to provide a recorder that will operate more efficiently, more effectively, and with more accuracy than recorders heretofore available.

Other and further objects of the present invention will become apparent from a detailed consideration of the following description when taken in conjunction with the appended drawings in which:

Figure 14 is a view in perspective showing the five speed transmission and 60:1 speed change system of the timing drive;

Figure 15 is a view in perspective showing the gear train and timing drive spool;

Fig. 18 is a fragmentary section showing a modification of the pressure roll assembly;

Fig. 19 is a partial front view of the pressure roll assembly of Fig. 18;

Fig. 20 is a fragmentary perspective view showing a modified braking arrangement for the gear train of Fig. 15;

Fig. 21 is a perspective view of a modified holder for the paper supply roll.

In principle, the recorder of the present invention employs two biased magnetic clutches driven in opposite directions and connected through a push-pull linkage with a recording pen or the like. This arrangement provides the necessary characteristics for a meter movement to meet the requirements of use. The clutches transmit the power from the driving motor to the recording instrument responsive to the input signal to the clutches which, of course, controls their coupling. Thus, a power amplification of the input signal is obtained in much the same manner as a vacuum tube controls the power from a power supply. This scheme of power amplification is to be distinguished from recorders wherein the electrical input signal is converted into mechanical energy which is directly used to drive the recording instrument.

It will be appreciated that the curve of torque versus current for a single clutch is not linear. However, it has been discovered that when two clutches are magnetically biased in opposite directions and their driven shafts interconnected by a push-pull linkage, the resulting output torque bears a substantially linear relationship with the input current. The above movement can be made quite rugged, and yet consistently will respond rapidly to current changes whether they be of magnitude or direction with the accuracy and sensitiveness that is necessary to measure very small currents. The above described clutch arrangement is the subject of copending application Serial No. 130,413 filed December 1, 1949, which is now Patent No. 2,651,754, issued September 8, 1953.

Figure 13:
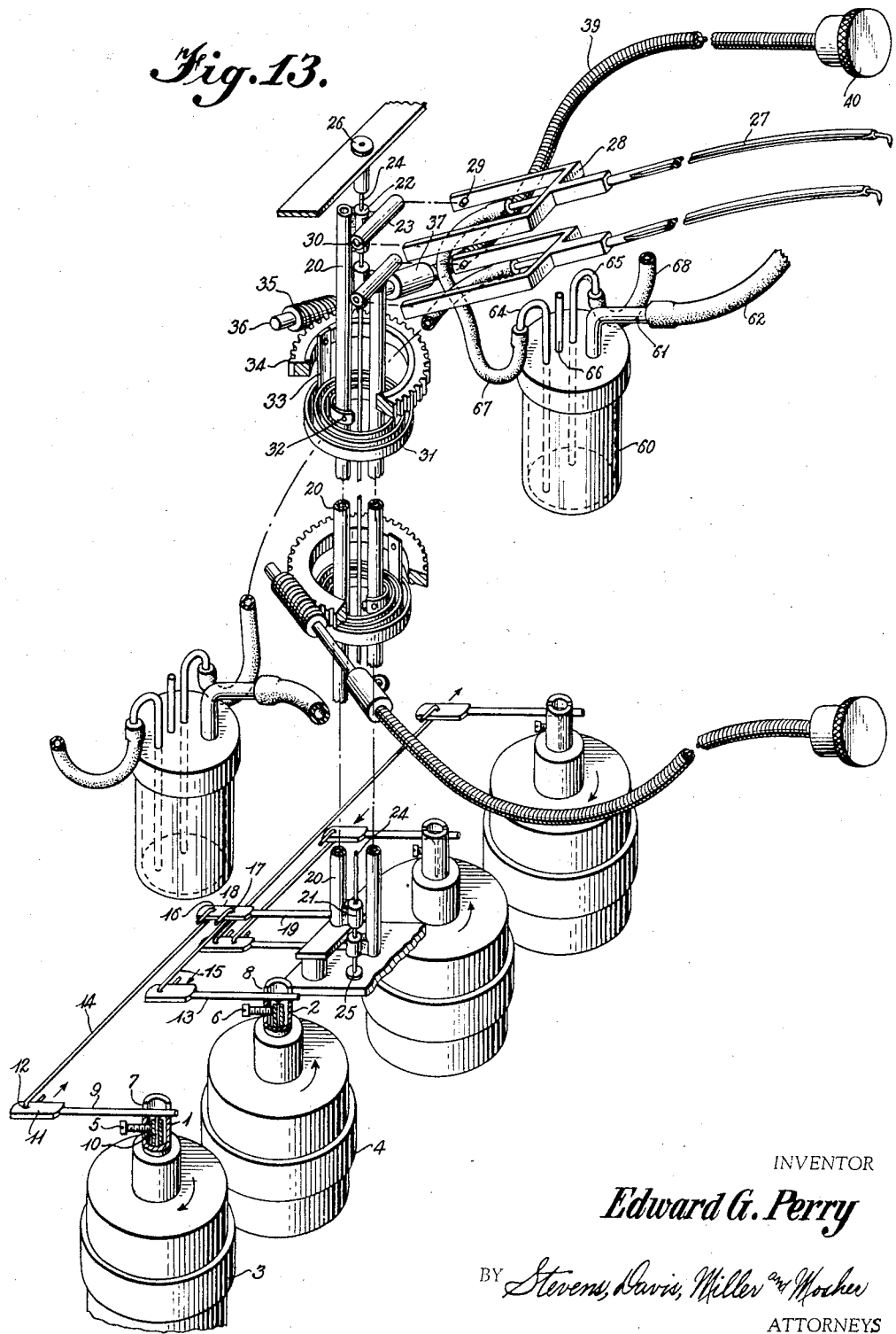
Figure 13 is an exploded perspective view showing the movement of the recorder.

Referring now to the drawings, the linkage for connecting the push-pull meter movement with a recording instrument such as a pen to produce a pen movement corresponding in magnitude and direction with an input signal to the magnetic clutches is shown in Fig. 13. The arrangement shown is for a two pen recorder, but the basic principles of the linkage would apply equally as well to a single pen recorder or a recorder having three or more pens. Only the linkage for one pen is described since the two linkages are identical.

A pair of couplings 1 and 2 having keyways 7 and 8 are fitted over the output shafts of magnetic clutches 3 and 4 and are fixed to the shafts by means of set screws 5 and 6. An arm 9, characterized by a projecting pin 10 at one end and a flat portion 11 having an eye 12 at the other end, is joined to the output shaft of clutch 3 as follows: The non-flat end of arm 9 fits into keyway 7 and the projecting pin 10 extends down into the output shaft which is hollow for the purpose of preventing axial movement of arm 9. An arm 13, similar to arm 9 except being a little shorter, is joined to the output shaft of clutch 4 in a like manner. The arms 9 and 13 are connected by means of suitable links 14 and 15 to the eyes 16 and 17 of the flat end portion 18 of a third arm 19. The shank portion of arm 19 is mounted for pivotal movement. Thus, when the clutches 3 and 4 are rotating at the same rate and in opposite directions, as shown by the arrows in Fig. 13, arm 19 will not turn in either direction since the push exerted by link 14 will be balanced by the pull in link 15.

Arm 19 is an integral part of the pen pivot assembly which consists of arm 19, shaft 20, hinges 21 and 22, and cross-arm 23. Arm 19 is rigidly attached to the lower end and normal to the longitudinal axis of shaft 20. The two hinges 21 and 22 are mounted on the opposite side of the shaft 20 from arm 19, one at the top and the other at the lower end of shaft 20. Cross-arm 23 is rigidly connected to hinge 22 with its longitudinal axis disposed 90° to arm 19. A pin 24 passes through hinges 21 and 22 and is attached to a sub-frame assembly of the recorder at its bottom end as indicated at 25 and its top end as indicated at 26 by any known means. The pen pivot assembly is, therefore, free to turn in either direction by pivoting about pin 24 responsive to the signals transmitted through linkages 14 and 15 to arm 19.

The pen assembly consists of pen 27, yoke 28 which carries the pen 27, and projections on the inside of either arm of the yoke 28 as shown at 29. Cross-arm 23 is hollow and these projections 29 on the yoke 28 fit into the open ends 30 of the cross-arm. By this arrangement, the pen strokes in the direction of the turning of the pen pivot assembly and records on a chart marks directly related to the signal strength input to clutches 3 and 4.

From the apparatus previously described it will be noted that the pen 27, after moving in response to an input signal to clutches 3 and 4, will not return to its starting position after the push-pull linkages 14 and 15 reach an equilibrium condition in the absence of a restoring force.

Hence it is essential to provide a restoring means to return the pen back to a fixed starting position corresponding to a zero-input signal to clutches 3 and 4. Further, it is desirable to have some restraining means to prevent the pen from running off the edge of the chart upon which it is recording. A hair spring 31 provides the necessary restoring and restraining force. The inside coil of hair spring 31 is clamped to shaft 20 by some suitable means such as clamp and screw 32. The outside coil of spring 31 is attached to one end of flat bar 33. The other end of flat bar 33 is attached to a ring gear 34 suitably supported by a portion of the recorder frame for rotary motion. The recorder frame is not shown in Fig. 13 for purposes of clarity. As the pen pivot assembly is turned by arm 19 in response to an input signal to the clutches, the spring 31 will either be wound or unwound. When the impressed signal to the clutches has passed, the spring 31 will return to its normal at rest position, thus rotating the shaft 20 until the pen 27 is at zero. One of the advantages of a push-pull linkage is that the pen experiences no backlash when restored to zero due to the continuous thrust on the linkage.

Figure 1:
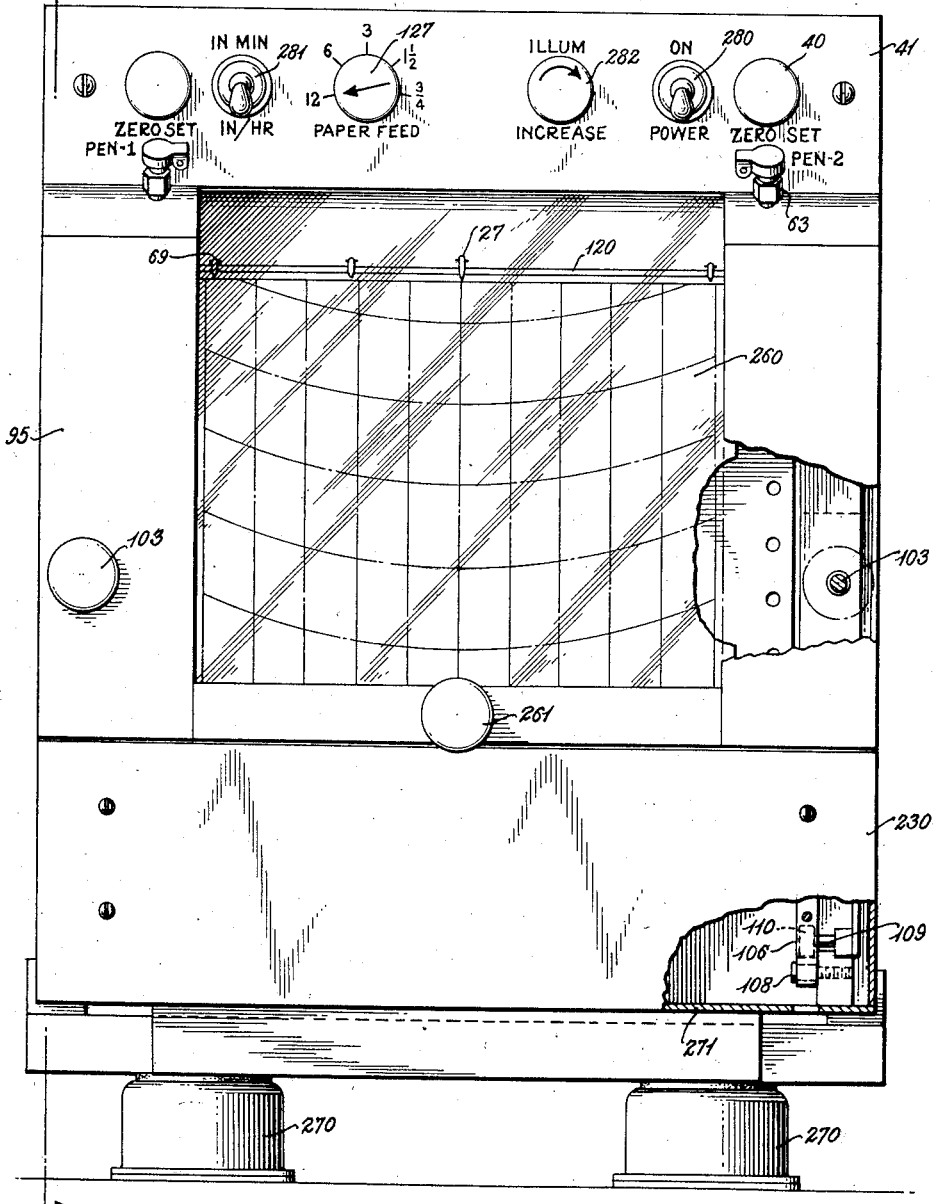
Figure 1 is a view in front elevation partly broken away showing the recorder of the present invention.

Ring gear 34, as indicated above, is mounted on a sub-frame assembly and is mounted to be freely rotatable. A worm gear 35 is fixed to a shaft 36 which is coupled through a sleeve 37 and set screw (not shown) to one end of a flexible cable 39. Worm gear 35 is similarly mounted on a sub-frame assembly to be freely rotatable. Coupled to the other end of cable 39 is a knurled knob 40 which is mounted on the outside cover 41 (see Figure 1) of the recorder case by suitable means. Shaft 36 and worm gear 35 are mounted on the same sub-frame as the ring gear 34 with worm gear 35 in meshing engagement with the ring gear 34.

From the above description it will be apparent that knurled knob 40 will permit a zero adjustment for pen 27. As knob 40 is turned, the cable 39 and shaft 36 rotate the worm gear 35. Since ring gear 34 is meshing with worm gear 35, movement of the latter will result in a corresponding movement of the former. Depending on which direction the worm gear 35 is rotated, the ring gear 34 will either increase or decrease the tension of spring 31 causing the pen pivot assembly and pen 27 to be moved either to the left or to the right. Thus, the pen 27 can readily be centered on the zero axis of the chart due to the nature of the worm gear drive and held against movement except by the action of the clutches.

Figure 16:
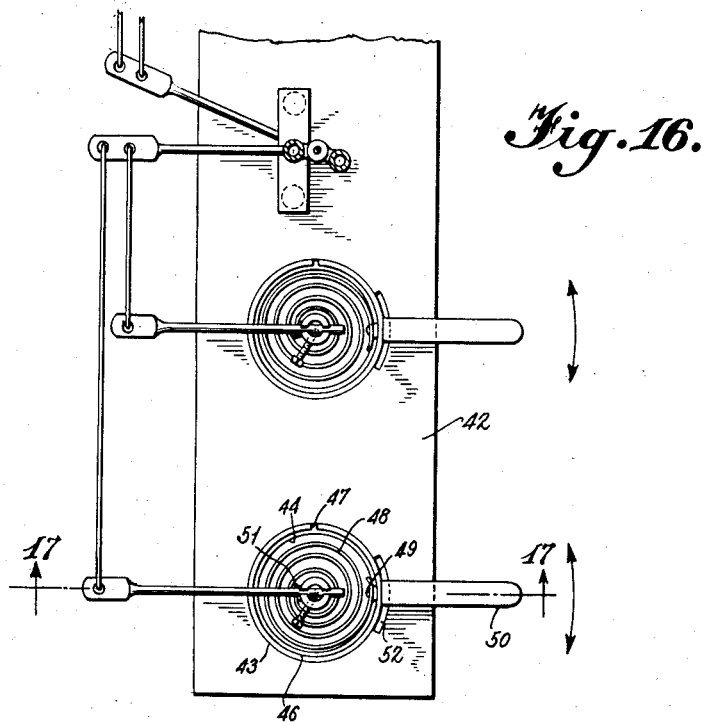
Figure 16 is a view in top plan showing a modified arrangement for the restoring force for the movement.
Figure 17:
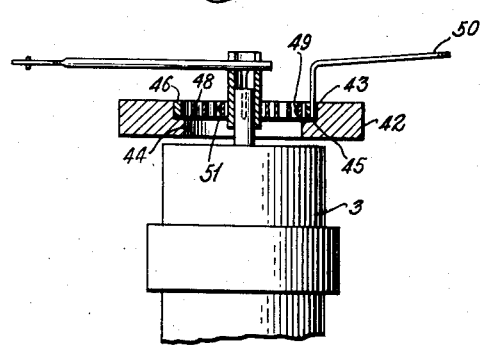
Figure 17 is a view in vertical section of Figure 16 taken along line 17—17.

In place of using the spring 31 attached to the pen pivot assembly as above described, an alternative arrangement can be made by using dual hair springs attached to the clutch output shafts as shown in Figs. 16 and 17. Only the arrangement for one spring will be described since the arrangements are identical with the exception that the springs are wound in opposite directions. The reason for this difference is that the clutches rotate in opposite directions. A mounting plate 42 characterized by a bore 43 extending to approximately half the depth of plate 42 and bore 44 extending the remaining distance through plate 42 is fitted over each of the output shafts of clutches 3 and 4. The diameter of bore 43 is slightly larger than the diameter of bore 44 and thus a shoulder 45 is formed between the two bores. A ring 46 split at 47 is mounted inside of bore 43 on shoulder 45. Ring 46 is similar in design to a piston ring. A hairspring 48 is mounted inside of ring 46 with its outside spring coil connected to ring 46 by suitable means such as a screw 49. Also, a ring turning lug 50 is connected to the outside spring coil and ring 46 by screw 49. The inside spring coil is fastened to coupling 1 by some means such as by a screw 51. Either of the above connections can be accomplished in any suitable manner such as soldering, etc., and the connecting means is not necessarily limited to screws 49 and 51. A turning lug guide or slot 52 is formed in an arc in mounting plate 42 as indicated.

In assembling the above apparatus, the ring 46 is compressed and inserted into bore 43. As the ring 46 is released, it expands and forms a friction bond with the wall of bore 43. Coupling 1 is then fitted over the clutch output shaft and secured by set screw 5. Thereafter, spring 48 is placed within ring 46 and connected as above-described. By turning lug 50 on both clutches, the two springs 48 will rotate the clutch output shafts causing a correlative movement of the push-pull linkage and pen pivot assembly. Thus the chart pen 27 can be readily and easily set to zero. It is to be fully understood that the method for adjusting the dual hairsprings is not to be construed as limited to the use of individual turning lugs 50. For example, the lugs can be linked or geared together and a single operating lever or turning knob can be used to effect the necessary adjustment. By linking or gearing the lugs together it is possible to bring the operating lever or knob outside of the recorder case thereby permitting the adjustments to be accomplished with ease.

There are several advantages to the use of dual hairsprings shown in Figs. 16 and 17 over the single hairspring mounted on the pen pivot assembly shown in Fig. 13. The system of Figs. 16 and 17 reduces the no-signal loading of the bearing points of the linkage and also reduces the loading on the pen pivot assembly when the pen is displaced from zero. As a reduction in loading will be accompanied by a corresponding reduction in friction, life of the linkage and pen pivot assembly will be materially increased. The springs being wound in opposite directions will be self-compensating with respect to both temperature and non-linearity changes. As a further refinement, if desired, the springs can be deliberately designed to compensate not fully for the no-signal torque. By this plan the uncompensated torque would serve to take the slack out of the system.

The pressure priming system for supplying ink to the several pens of the recorder is illustrated in Fig. 13. The arrangement for only one set of pens will be described as the arrangements for both sets of pens are identical. An inkwell 60, made of any suitable material to permit the ink level to be observed, is provided with an elbow 61 which connects with one end of a filler tube 62. The other end of filler tube 62 is connected to a fitting 63 (see Fig. 1) located at an accessible spot on the outside cover 41 of the recorder which will enable the inkwell 60 to be easily filled. It will be noted that elbow 61 is fitted into the top of inkwell 60. Each of two hollow metal tubes 64 and 65 are fitted in the top of well 60 with one end of each tube terminating adjacent the bottom of the inkwell. The other end of each tube extends outside the inkwell and is curved in a semi-circle. Atmospheric pressure on the ink fluid is supplied through a breather tube 66. Ink is supplied to pen 27 through a flexible tube 67 which connects with the end of hollow metal tube 64. A flexible tube 68 is connected with tube 65 and serves to supply ink to a timing marker pen 69 (shown in Fig. 6) which will be described in detail hereinafter.

Pressure priming can be accomplished in either of two ways. In the first way, each set of pens can be primed individually by stopping up the breather tubes and supplying pressure to the filler tube. In the second way, the two breather tubes can be connected together so that one of the filler tubes actually acts as a breather when the other tube is being used for filling. To prime, one filler tube can be stopped up and pressure applied to the other, thereby supplying pressure to both inkwells for priming purposes. The pressure can be normally applied by using a small collapsible rubber bulb that fits over the recorder case connection 63 to the filler tube.

Figure 2:
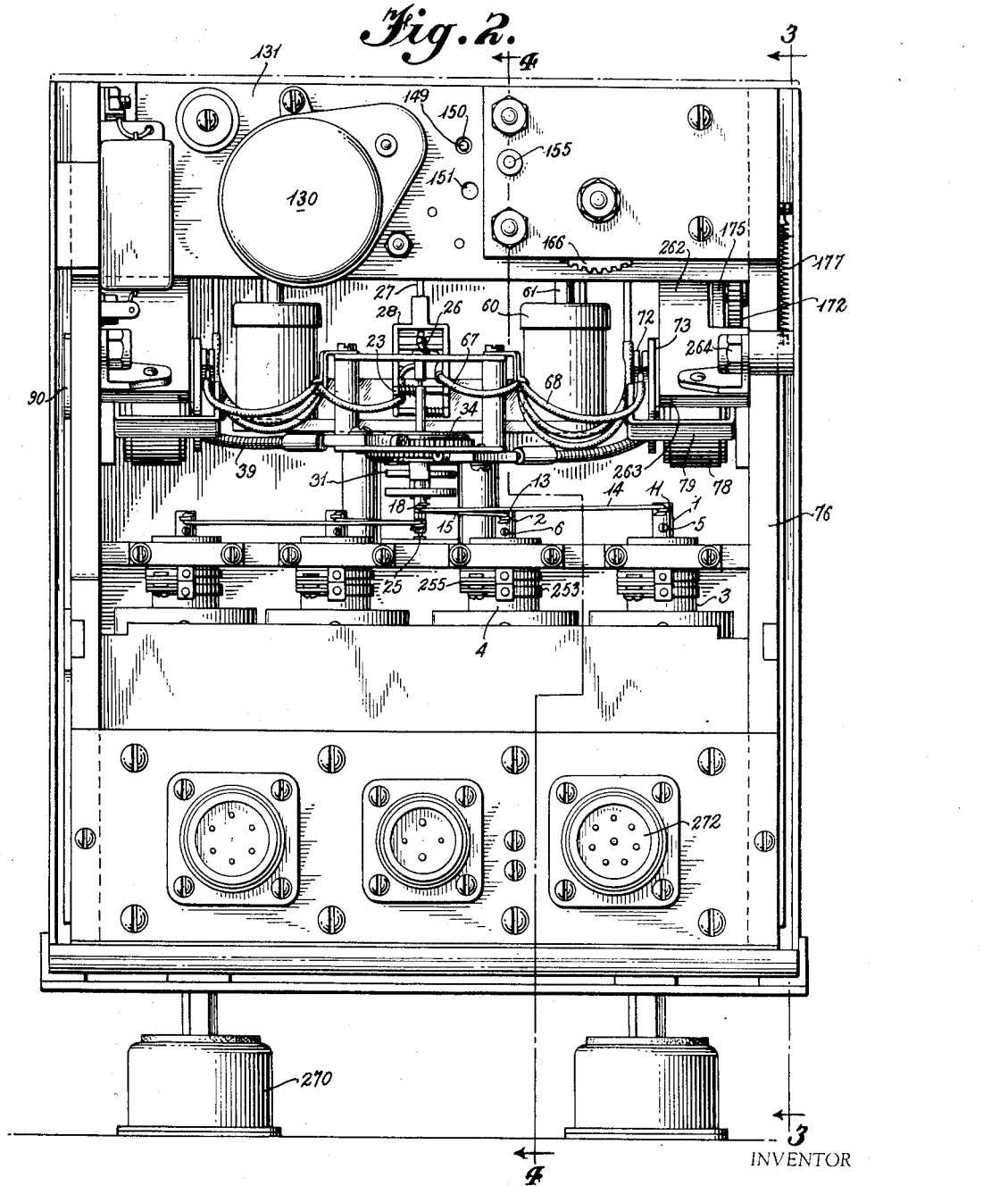
Figure 2 is a view in rear elevation of the recorder of Figure 1 with the cover removed.
Figure 6:
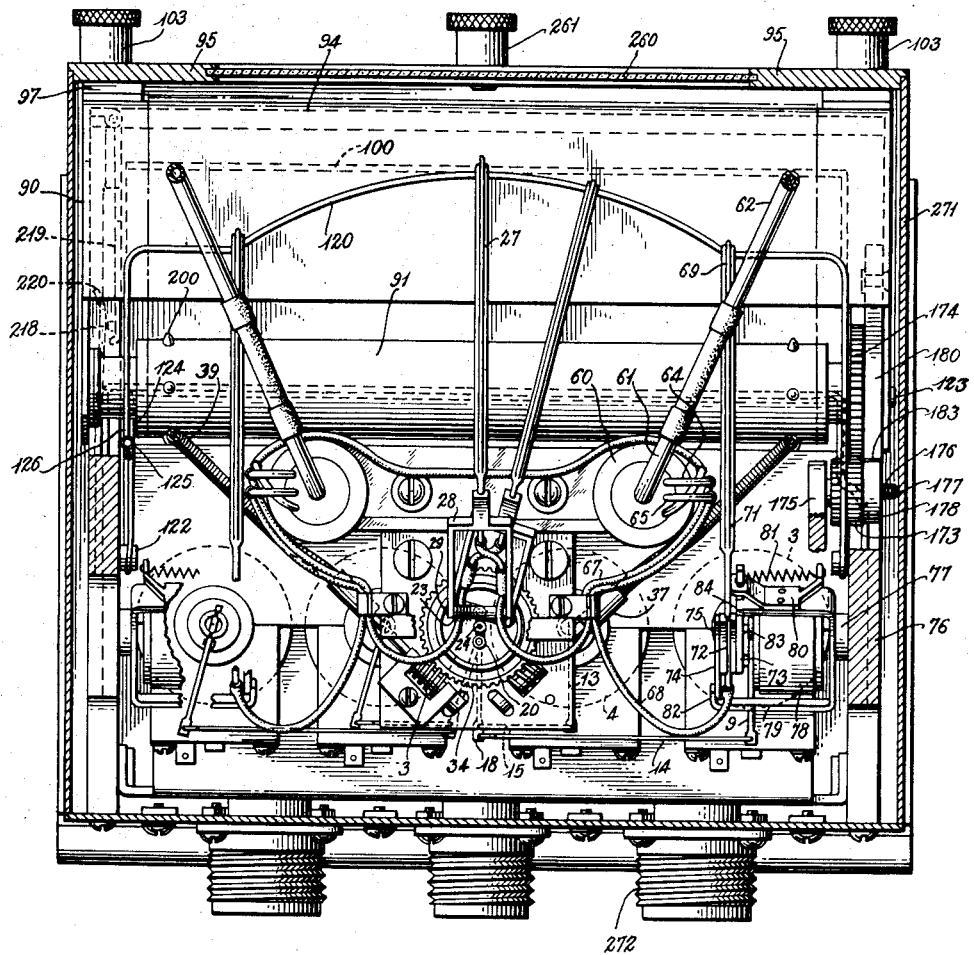
Figure 6 is a view in horizontal section of Figure 3 taken along line 6—6.
Figure 7:
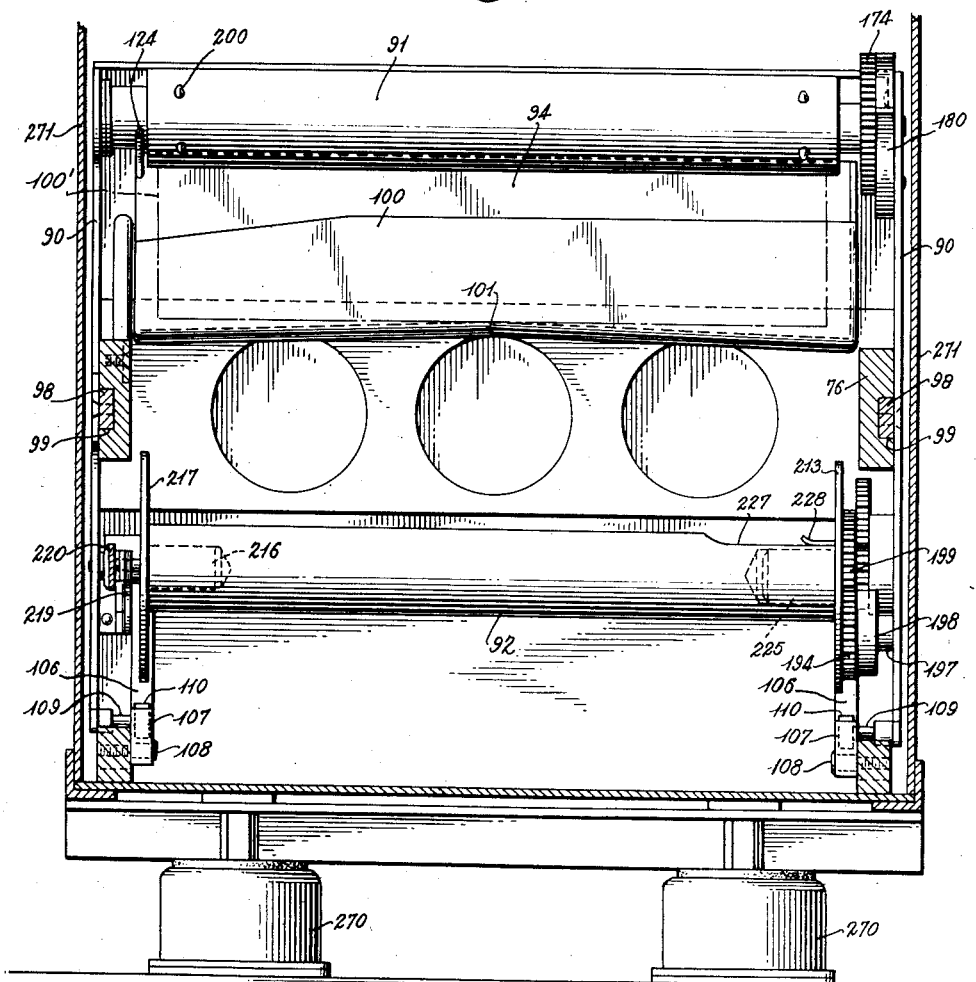
Figure 7 is a view in vertical section of Figure 3 taken along line 7—7.

Two timing marker pens are mounted in the recorder, one on each side wall of the recorder case. They are so fixed that a line will be traced along each margin of the chart paper. Figs. 2 and 6 illustrate the mounting for the timing marker pens and their operating equipment. Only one timing pen will be described since both are mounted and operated identically. Pen 71 is mounted in a holder block 72, which is slotted to receive the pen shank. Arms 73 and 74 are screwed to the holder block 72 by screws 75. The entire marker pen assembly is mounted on the recorder side wall 76 by spacer block 77 and a screw not shown. The screw extends through wall 76, spacer block 77, and mounts a solenoid 78 in place inside of a frame 79. A spring mounting bracket 80 is attached to one side of frame 79. One end of a spring 81 is attached to one arm of the mounting bracket 80, and the other end is attached to the end of arm 73. Frame 79 is curved at 82 to act as a stop on arm 74. Signals to operate this timing marker pen are applied to solenoid 78 through a separate circuit which is controlled by the recorder operator. Whenever a signal is applied to the solenoid, its armature 83 which is fixed to the arm 73 is magnetically attracted into the solenoid. The movement of armature 83 into solenoid 78 causes the pen holder assembly to pivot about point 84 and stretch spring 81 increasing its tension. Point 84 is defined by one end of frame 79 abutting against arm 73. After the signal is removed, spring 81 pulls the pen holder assembly back to normal, which position is reached when arm 74 stops on the curved portion 82 of frame 79. The purpose of these timing marker pens is to provide a test check against the chart speed, as well as a record of the time when events occur.

Figure 9:
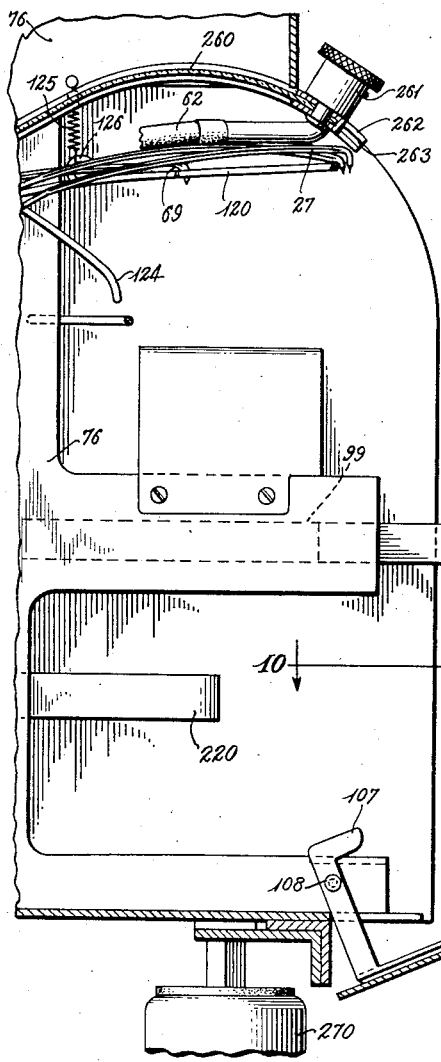
Figure 9 is a fragmentary section similar to Figure 4 with the paper carriage partly removed.

The paper carriage assembly shown in Figs. 3, 4, 7, 9 and 10 consists of two frame sections 90 which are separated by a timing drive spool 91, a takeup spool 92, and a pressure roll 93. Each frame section 90 supports one end of these various rolls. A flat metal sheet 94 extends between these two frame sections 90 and is connected to each. Sheet 94 serves as a writing surface for the pens and also to make the carriage assembly rigid. Attached to each section 90 but spaced therefrom by a block 97 is a metal strip 95 with a recessed slot 96. A guide 98 is screwed to the middle section of each frame 90 and slides in a slot 99, which is firmly attached to the side wall 76 of the recorder frame. Thus, the paper carriage assembly is removable from the recorder case as shown in Fig. 9.

The paper carriage assembly also includes a box 100 which holds the paper supply roll 100'. It will be noted that box 100 is so formed that there is a very slight rise in the center line of the box as shown at point 101 in Fig. 7. Further, box 100 is arranged with sloping bottom as shown in Fig. 9. The purpose of this raised portion of the box at point 101 is to provide a one point contact of the paper supply roll with the supply holder box 100. This one point contact combined with the sloping bottom keeps the paper roll from turning sideways and provides a very low friction resistance to turning. Extending through each frame section or metal strip 95 is a screw 102 having on its outside end a knurled knob 103. A threaded hole is arranged along each edge of the recorder side walls for the purpose of receiving screw 102. By the arrangement above described, the paper carriage assembly can be removed and put back into the recorder readily and with great ease. This, of course, permits an inspection of the internal working mechanisms of the recorder simply by removing the paper carriage assembly. Further, removal of the paper carriage assembly will enable the operator to rapidly change the paper supply roll after it has been totally transferred to takeup roll 92 from box 100. To remove the paper carriage assembly the screws 102 are loosened from the threaded holes in the side walls of the recorder frame and the paper carriage assembly is slid forward and removed from the recorder.

Pressure roll 93, which is part of the paper carriage assembly as above described, is arranged in conjunction with a forcing presure roll 104. This presure roll 104 is freely mounted on a shaft 105 with each end of the shaft carried at one end of a right angle arm 106 located on either side of the recorder. More particularly this construction consists of two T-shaped elements bent to form L-shaped arms 106 with the upright legs being spring sections. A flat plate having a top flange is fitted between the arms 106. Two shaft mounting blocks are secured in the upper corners of the assembly and they hold the ends of shaft 105. In mounting the assembly on the recorder frame the spring sections are slightly deflected to create a positive spring pressure between rolls 104 and 93. At the other end of each right angle arm 106 the bent legs of the T form an extended curved lip 107. Arm 106 pivots about a point 108 defined by a pivot pin passing through the bent legs and secured to the frame of the recorder. At the bottom of the paper carriage frame 90 on each side a pin 109 mounts a roller 110. The roller 110 is mounted for free rotation on the pin 109. When the paper carriage assembly is fully secured in the recorder, roller 110 presses against lip 107 and forces pressure roll 104 against pressure roll 93 of the paper carriage assembly in a positive manner as above described. To remove the paper carriage assembly from the recorder, roller 110 is first moved away from lip 107. Freeing lip 107 will permit arm 106 to pivot downwardly about point 108 due to gravity. This action will swing arm 106 clear of the paper carriage assembly permitting it to be completely removed. If for some reason the arm 106 does not swing clear, the frame sections 90 will force the arms 106 clear during removal of the paper carriage assembly.

In place of using the pressure roll assembly shown in Fig. 9, the following arrangement shown in Figs. 18 and 19 can be adopted. A pair of flat springs 112 can be looped at their lower ends 113 to support the ends of shaft 105 of the pressure roll 104. The upper ends of the springs can be attached at 114 to metal strips of the paper carriage assembly. In this arrangement both pressure rolls 93 and 104 are mounted on the paper carriage assembly and move with it. One advantage in using the pressure roll assembly shown in Figure 9 rather than the flat springs arrangement just described is that the operation of loading the chart paper is easier.

By being able to swing pressure roll 104 out of the way and remove the paper carriage assembly, the box method of holding the supply paper roll makes loading of the recorder a simple process. After the paper roll 100' has been placed in box 100, the paper is wrapped around roll 91, pressure roll 93 and wound on takeup roll 92. Each margin of the chart drive paper is punched with equally spaced holes which fit over sprocket projections 200 on either end of the drive roll 91. This permits a positive chart paper drive. The chart paper lies on plate 94 which serves as a writing surface. The paper supply roll 100' in lieu of being held in box 100 can be supported in the paper carriage assembly by hinged hubs attached to the frames 90.

The recorder of the present invention is further provided with a means for lifting the pens which operates in connection with the removal of the paper carriage assembly. The pens automatically are lifted clear of the chart paper as the paper carriage assembly is removed from the recorder. The pen lifter consists essentially of a wire 120 bent in a U shape which passes underneath all of the recorder pens. The legs of the U extend toward the back of the recorder and are bent around projections extending from the sides of the recorder case. These projections are indicated in the drawing by the numeral 121 and the looped portion of the wire 120 is indicated as 122. One leg of the wire 120 on one side of the recorder terminates just beyond its corresponding projection 121. The other leg of wire 120 extends back toward the front of the recorder to the paper carriage position and is formed into a cam riding surface 124. A spring 125 is fastened at its lower end to a loop 126 in the U-shaped section of wire 120 and at its upper end to the recorder case 76. As the paper carriage is placed in the recorder, an extension of the timing drive spool shaft 123 rides on the cam riding surface of the wire 120 pivoting the U section wire 120 downwardly about projections 121 increasing the tension of spring 125 and lowering the pens to the writing surface formed by plate 94. When the paper carriage assembly is removed from the recorder, the tensioned spring 125 pivots the U section wire 120 upwardly as the shaft 123 moves off the cam surface 124 and the pens are lifted clear of the paper. The spring 125 under this arrangement assumes its normal no-tension position when the carirage is removed.

The chart drive system is made up of two major components. The first major component is the timing drive system and is composed of the timing motor, five-speed transmission, 60:1 speed change system, and a gear train engaging with the timing drive spool 91. The other major component consists of a power supply from the main drive motor, gear train engaging with each of the takeup spool, friction hub, and pressure rolls. The first major component is shown in Fig. 14 and Fig. 15. Fig. 14 shows the five-speed transmission and 60:1 speed change system of the timing drive and Fig. 15 shows the gear train and timing drive spool of the paper carriage assembly. Fig. 15 also shows the second major component.

Figure 5:
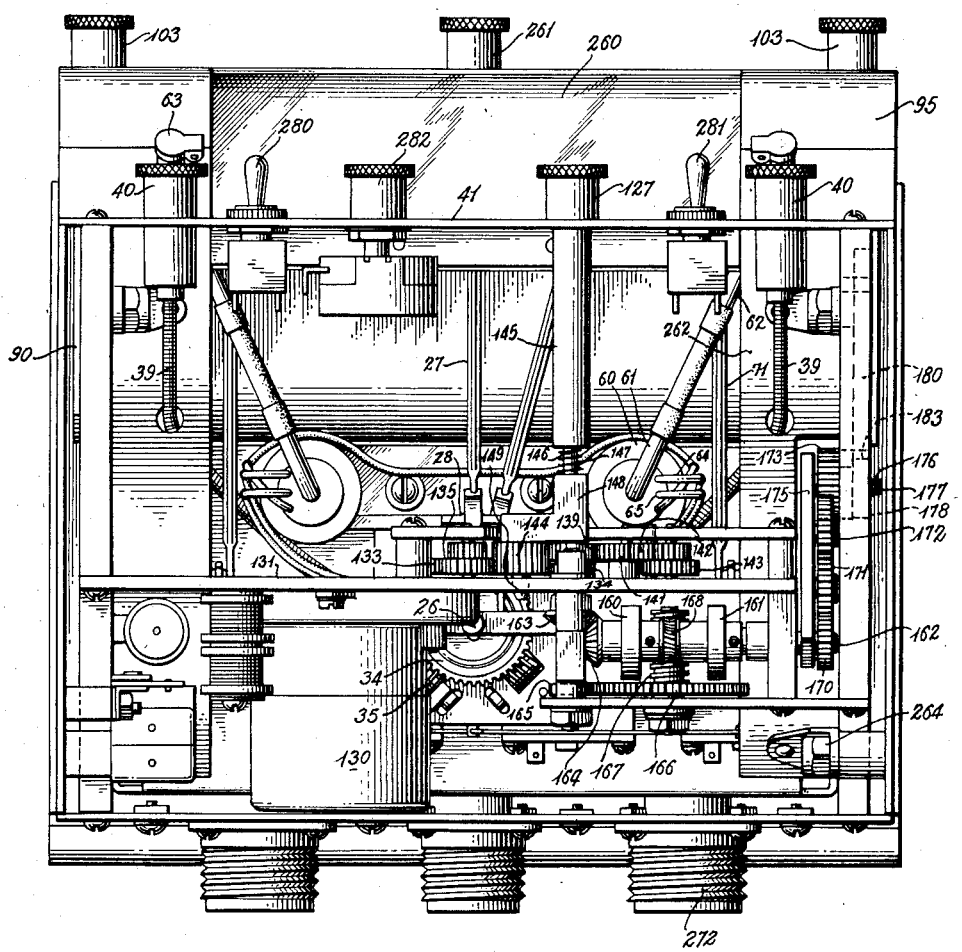
Figure 5 is a view in top plan with the cover removed.

The timing drive motor 130 is mounted on a transmission plate 131 with its output shaft 132 extending through the plate 131. A driving pinion 133 is attached to the output shaft 132 and connects with the five-speed transmission. The five-speed transmission consists of a series of meshing gears arranged in a semi-circle around an engaging gear 134. The semi-circular gear train, numbers 135 to 143, is connected with the engaging gear 134 by an idler gear 144 which is carried by the speed shifting assembly. The speed shifting assembly is made up of a turning knob 127 (see Fig. 5), sleeve 145, shaft 146, spring 147, right angle arm 148, idler gear 144, and centering pin 149. The turning knob 127 and right angle arm 148 are fastened to shaft 146 by some suitable means, as for example, a set screw. Spring 147 is placed around shaft 146 and bears against the face of arm 148 and the outside cover 41 of the recorder (see Fig. 5). Thus, as knob 127 (see Fig. 5) is pulled out, the centering pin 149 will disengage from one of the five holes, numbers 150 through 154, in the transmission mounting plate 131 and spring 147 will be compressed. A bore 128 drilled in arm 148 receives a shaft 155 which acts as a guide and centering pin for the speed shifting assembly as different speeds are selected. The shaft 155 is the same shaft or an xtension of the shaft which mounts the gear 134. The sleeve 145 encloses both the spring 147 and the shaft 146, but is slightly shorter than the distance between the arm 148 and the recorder case 41 (see Fig. 5). The sleeve 145 is purposely selected to be slightly shorter to limit the amount that the knob 127 can be pulled out and thereby limit the movement of the arm 148 and idler gear 144 out of the semi-circular gear train. The amount of movement of arm 148 and shaft 146 is governed by idler gear 144. It is sufficient movement if the idler gear 144 will completely disengage from any one of the several gears in the semi-circular gear train. Thus, by pulling out and turning knob 127, any one of five speeds can be selected. When the knob 127 is released, the spring 147 tends to force the shifting assembly to engage with the semi-circular gear train. The timing drive motor 130 is made to operate reversibly so that the output shaft 155 of the five-speed transmission can be rotated in either direction at will.

The principal object of the 60:1 speed change system is to drive the chart paper in either inches per hour or inches per minute. This is accomplished by using two over-riding clutches 160 and 161. The arrangement of the two over-riding clutches 160 and 161 is such that regardless of the direction of rotation of the timing drive motor 130, the output shaft 162 will always rotate in the same direction. The clutch 160 is driven by miter gear 163 on shaft 155 and a miter gear 164 mounted on the input shaft to clutch 160. Clutch 161 is driven by spur gear 165, spur gear 166, worm gear 167 mounted on the shaft of spur gear 166 and pinion gear 168. Assuming that the timing drive motor 130 is turning so that clutch 160 will be driven in a clockwise direction, at the same time clutch 161, through its gearing, will be turning opposite to clutch 160. In this situation clutch 160 will be driving and clutch 161 will be slipping. However, when drive motor 130 reverses direction, the clutch 161 will turn the output shaft 162 clockwise and the clutch 160 will then slip.

This constant direction of rotation is transmitted by the gear train 170 through 173 to gear 174, which is directly attached to the shaft holding the timing drive spool 91. Therefore, the timing motor 130 drives the timing drive spool 91 which in turn advances the chart paper 185. Spool 91 has sprockets 200 which engage holes 156 in the paper 185 to uniformly advance paper 185 responsive to rotation of spool 91. Gear 170 is connected to shaft 162 while the remainder of the gears 171 through 173 are mounted on an arm 175. The mounting is by conventional means, namely pins, which permit the several gears to rotate freely. The shaft 162 extends through a hole drilled in one end of the arm 175 or alternatively lies in a slot at the end of arm 175. While the arm 175 does not turn with the shaft 162, it is free to move about the shaft 162. Hence, the gear 171 can rotate around the pitch diameter of gear 170 as the arm 175 moves up or down as the circumstances of the drive require. The end of the arm 175 remote from shaft 162 is spring supported from the recorder frame in the following manner. The pin 176 which projects from the arm 175 and holds gear 173 for free rotation is attached to one end of a spring 177 by suitable means such as a set screw or the like and the other end of the spring 177 is connected to the side wall of the recorder frame 76 at a point above the gear train (see Fig. 3). A disc 178 is fitted on the shaft 176 and arranged to rotate with gear 173.

Gear 174 is mounted on the paper carriage assembly and consequently is disengaged from the gear train above-described each time the paper carriage assembly is removed from the recorder. This will occur, for example, when it is necessary to replace the chart paper. To insure proper timing of the chart speed and also to insure that gear 174 will properly mesh with gear 173 of the gear train without binding, when the paper carriage assembly has been removed and replaced the following arrangement is employed. A pivoted friction brake shoe is mounted on the side frame section 90 of the paper carriage assembly. It will be noted that in the perspective drawing of Fig. 15 the side frame 90 is not shown for purposes of clarity. However, the friction brake piece indicated by the numeral 180 is pivotally mounted at one end to the side frame section 90 by means of pivot pin indicated as 181. The friction brake piece 180 is made with a guide slot 182 at aproximately two-thirds of the length of the piece from the pivot point 181. The other end of the brake piece 180 is curved inwardly with the same radius as the disc 178. Thus the curved portion of the brake piece 180 acts in effect as a brake shoe. This portion of the brake piece has been identified by the numeral 183. The brake piece 180 is mounted to angle upwardly and to guide slot 182 rides on an extension of the timing drive spool shaft 123. As the paper carriage assembly is moved into position the friction brake piece 180 engages the disc 178 and guides the arm 175 downwardly against the tension of spring 177 as the brake piece itself pivots upwardly. The spring 177 is stretched as the arm is moved downwardly, thereby forcing the disc 178 into the brake shoe 183.

When a pull is put on the chart paper, indicated in Fig. 15 by the numeral 185, the gear 174 tends to rotate faster than the timing gear train and thereby creates an upward thrust on the gear 173. The disc 178, which is carried on the shaft 176 with gear 173 is forced into the brake shoe 183 increasing the friction between the brake shoe 183 and the surface of the disc 178 until it balances the pull on the paper 185. This arrangement, in addition to acting as a braking means, also serves to prevent the gear teeth on gears 173 and 174 from meshing too deeply and thereby binding the gear drive. The above-described operation of the friction brake occurs when the gear 174 tends to rotate faster than the gear 173 which is the last gear of the gear train. Such a situation usually arises when there is a pull on the chart paper 185. The reverse operation happens when the gear 173 tends to rotate faster than the gear 174. That is, the rotation differential between the two gears acts against the spring 177 which then releases the pressure on the brake shoe 183 and allows the gear 174, and consequently the timing drive spool 91, to turn faster until a balanced condition is again reached.

In place of using a disc and brake shoe as above described to provide the necessary braking and spacing of gears 173 and 174, two discs 178 and 180a as shown in Fig. 20 can be used with disc 178 being fixed to gear 173 and the other disc 180a being fixed to gear 174. With this particular arrangement the disc diameters would be selected to be unequal to the pitch diameters of their respective gears. However, the sum of the disc diameters would be equal to the sum of the pitch diameters of the gears. The two discs would be in sliding friction contact at all times. Depending upon which gear was lagging or leading, the discs would be either forced into tighter contact or forced away from each other until a balanced condition was restored between the paper pull and the timing drive. The principle of operation of the two discs would be the same as in the case of the discs and brake shoe as shown in the drawings in Fig. 15.

Figure 3:
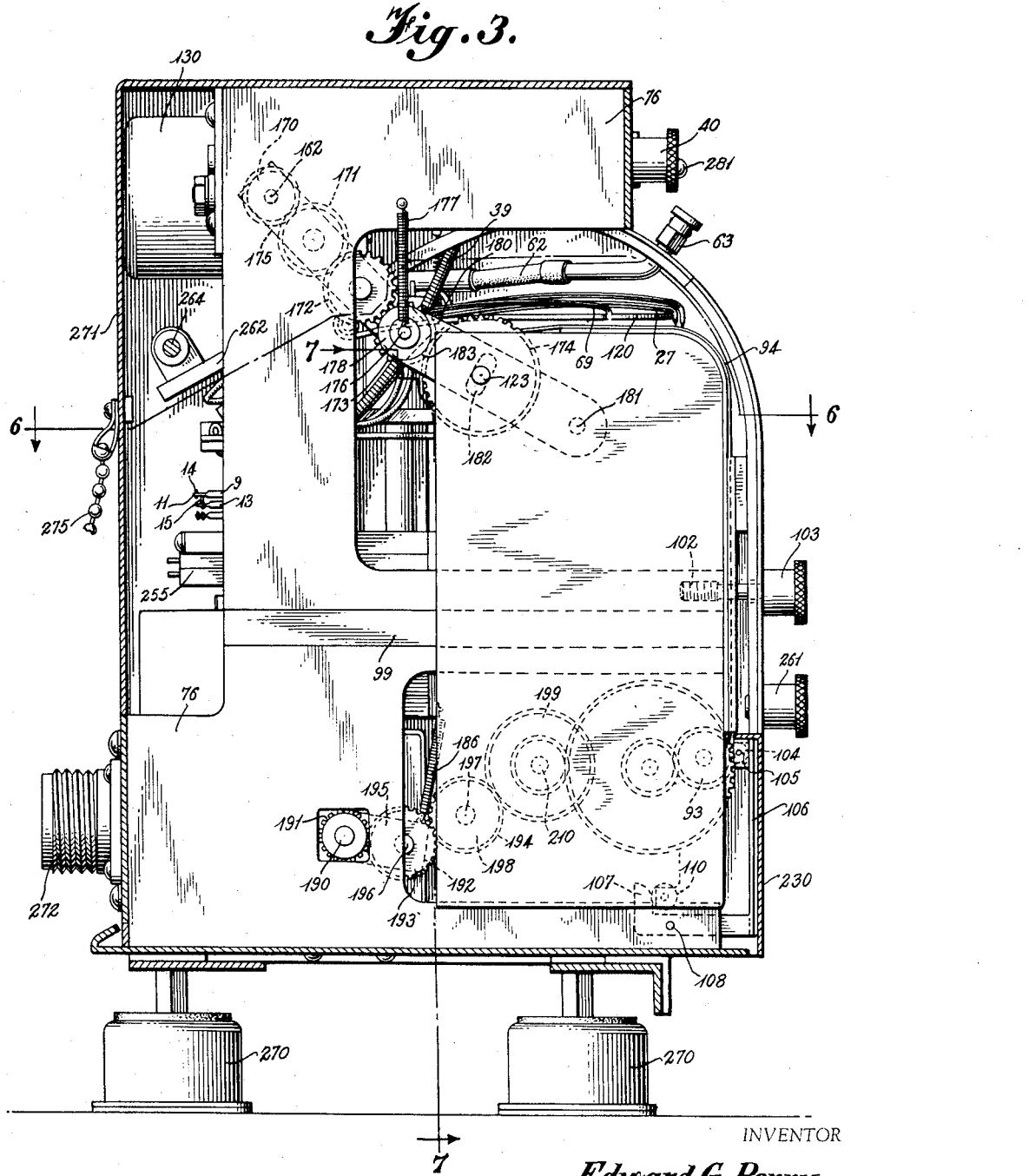
Figure 3 is a view in vertical section of Figures 1 and 2 taken along line 3—3.

The second major component of the chart drive system is illustrated in Fig. 15. The main drive motor, which supplies the power for the magnetic clutches, which driving arrangement will be described hereinafter, also supplies the power for the chart drive takeup spool 92 and the pressure roll 93. Both of these rolls are mounted on the paper carriage assembly. The gear train from the main drive take-off shaft 190 to the paper takeup gearing is similar in many respects to the gear train to the timing drive spool 91. A gear 191 is fastened to the shaft 190 and meshes with a gear carried on an arm 192. One end of the arm 192 is drilled or slotted so that the shaft 190 fits through the hole or in the slot and is free to turn. The arm 192 is supported at its other end by a low tension spring 186 which holds the arm 192 and gear 193 mounted on the arm in position to make contact with the gearing mounted on the paper carriage assembly. The spring 186 referred to in the preceding sentence is shown in Fig. 3 and is connected to the arm 192 in a manner similar to spring 177. By suitably arranging the gear 191 with respect to gear 193, the rotation of gear 193 can be so selected that its direction of rotation will assist the spring 186 in maintaining the arm 192 in a position that gear 193 will mesh with a gear 194 mounted on the paper carriage assembly. The simple arrangement previously described, however, is sometimes insufficient and often it is desirable to include at this point an overload protection device such as the one shown in Fig. 15. When using an overload protection device it is desirable to increase the spring strength and to rotate gear 193 in the opposite direction. A disc 195 is carried on the shaft 196 which mounts the gear 193 to the arm 192 and the diameter of the disc is selected to be equal to the pitch diameter of the gear 193. As shown in this drawing, the gear 193, carried on the arm 192, meshes with the gear 194 mounted on a shaft 197 supported by the paper carriage assembly. A disc equal in diameter to the pitch diameter of gear 194 is carried on the shaft 197 with the gear 194. The disc fixed with gear 194 is indicated in the drawing by the numeral 198.

Unlike the overload protection arrangement described in conjunction with gears 173 and 174, it is not necessary that these discs 195 and 198 be fixed to rotate with their respective gears since the necessary spacing control can be obtained simply by allowing the discs to rotate freely and independently. The purpose of the moving are 192, which is pivotally mounted in the recorder frame at one end, the spring 186, and the two discs 195 and 198 is to insure proper meshing of the gear train when the paper carriage assembly is put into position without having to maintain extremely small tolerances which would otherwise be necessary when the gears are inflexibly mounted. This reduces to a large extent binding in the gear train and renders the removal and replacement of the paper carriage assembly sure.

Gear 194 on the paper carriage assembly drives gear 199 mounted on the shaft of the paper take-up hub and thus causes the paper take-up hub to rotate. The remainder of the gear train is used to provide the correct speed of rotation to the pressure roll 93. The pressure roll 104, which is arranged in conjunction with pressure roll 93 is held against the roll 93 either by the means previously described or any other suitable means that would produce the requisite friction between these two rolls. The friction between the two rolls causes roll 104 to rotate as roll 93 is turned by the gear train. The paper advanced by the timing drive spool 91 by means of sprockets 200 passes between the pressure rolls 93 and 104 and then to the takeup spool 92. The friction brake systems above described are used to restrain the chart rate of speed against the pull on the paper created by the pressure rolls 93 and 104. Since the recorder is capable of many different chart speeds, it can be seen that the pressure rolls 93 and 104 and the takeup spool 92 must be capable of taking up the chart paper at any one of these speeds. In order to accomplish this function, the takeup system is so arranged that it actually runs at approximately 25% higher speed than the fastest chart speed.

Figure 11:
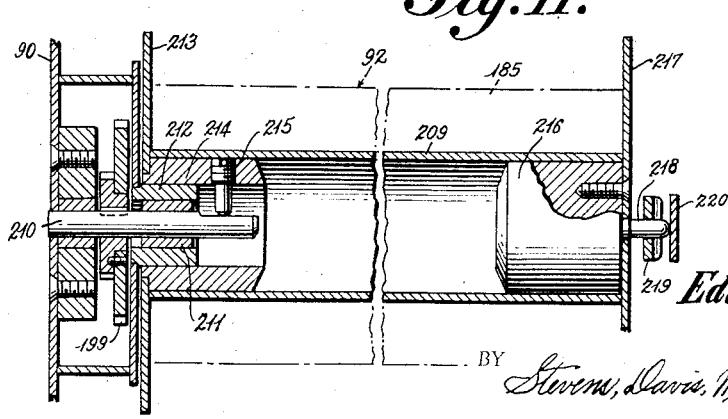
Figure 11 is a detailed sectional view of the friction take-up spool.

Figure 11 illustrates the system used in the takeup spool 92. The gear 199 is keyed to a shaft 210. This shaft 210 is supported by means of bearings 211 mounted in a bushing 212 which is in turn supported by a plate attached to the paper carriage side frame section 90. A hub 214 is fastened to the shaft 210 by means of a set screw 215. A spool flange 213 is securely attached to the hub 214. By this particular arrangement, the bushing 212 is securely fixed to the paper carriage frame 90 while the hub 214 is free to rotate with the gear 199. One end of a hollow cylinder 209 of some material such as cardboard or plastic fits over the hub 214 while the other end of the cylinder 209 fits over a hub 216. The hollow cylinder 209 is in effect the takeup spool 92 and acts as a shaft between the hubs 214 and 216. A spool flange 217 is attached to the hub 216 in a manner similar to the attachment of spool flange 213 to the hub 214. A pin 218 extends axially from hub 216 and spool flange 217. This hub and flange assembly is supported by a leaf 219 with a hole to receive the pin 218. Leaf 219 is hinged to the paper carriage frame at a suitable point along one of the metal sections 90. A flat spring 220 is attached to the recorder frame by screws or any other such suitable means. Spring 220 presses against the pin 218. The flat spring 220 by pressing on the pin 218, forces the cylinder 209 and paper 185 that is on the cylinder 209 against the spool flanges 213 and 217, creating in effect an integral takeup unit. The friction between the flanges 213 and 217 and the paper 185 as developed by the spring 220 operates to rotate the assembly as a whole and take up the paper. The friction to take up the paper is also supplied in part by the two hubs 214 and 216. By the particular arrangement just described, as the paper continues to build up on the takeup spool 92, the weight of the paper on the two hubs acts to increase appreciably the friction to the point where it becomes a large portion of the driving force. This increased utilization of the driving force offsets the increased torque necessary to take up the paper due to the increased diameter of the roll. It will also be appreciated that should the takeup driving means be moving faster than the feeding means, the cylinder 209 and paper wound thereon are free to slip on the two hubs 214 and 216, thereby preventing the paper from being broken.

Figure 12:
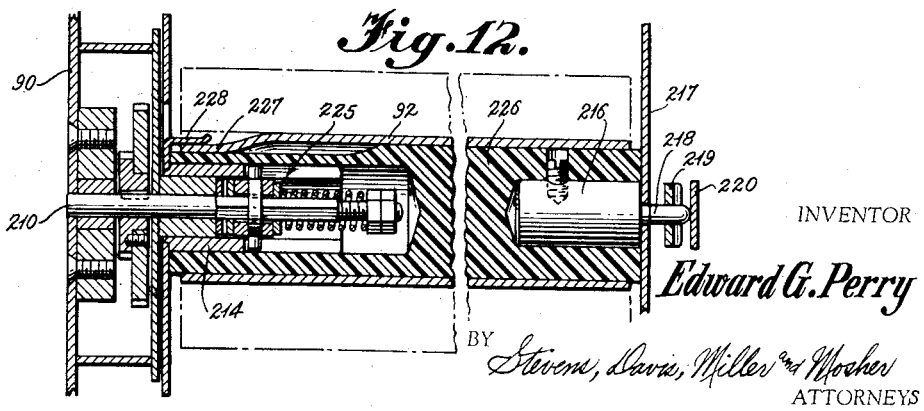
Figure 12 is a detailed sectional view of a modified friction take-up spool.

The arrangement for driving the paper takeup spool 92 is not limited to the mechanism above described. Other means, such as for example a friction clutch built into the hub 214 can be employed. Such a scheme is shown in Fig. 12. The friction clutch, if used, would supply the turning force without depending upon the friction between the paper and flanges and/or hubs of the previously described arrangement. The friction clutch is built into the hub 214 and consists of the conventional two-clutch members biased together by a spring. This clutch arrangement is generally indicated in Fig. 12 by the numeral 225. The hub 214 is provided with a shaft 226 which extends between and is fixed to the hubs 214 and 216. Like cylinder 209 the takeup spool 92 is removable from the shaft 226 when the paper carriage assembly is out of the recorder. It will be noted that the takeup spool 92 is provided with a flat portion 227 at one end, which flat portion slips under a lip 228 fixed to the hub. This enables the takeup spool 92 to be positively keyed to the hub 214 and turn with it.

The use of the above described chart drive system has several advantages. The power requirements of the timing and speed control motor 130 are extremely small and, therefore, the speed control motor 130 need only furnish very little power to the system. Actually, this motor 130 only controls the rate of advancement of the paper 185 since it is only connected to the feed spool 91. The remaining power requirements of the system are supplied by the main drive motor 240. Hence, by using the pressure rolls 93 and 104 and friction takeup spool 92, the need for an elaborate correlating system between the timing drive spool 91 and the takeup spool 92 to allow for many different paper speeds is wholly eliminated. The simplicity of the system renders its operation more efficient and effective and thereby more versatile. At the conclusion of the recording operation, the chart paper 185 can be readily removed from the recorder and a new chart paper put into position very easily. When the arms 106 have swung the pressure roller 104 away from the pressure roller 93, the paper carriage assembly can be removed from the recorder as above described. By permitting the paper carriage assembly to be easily removed from the recorder and by employing the box arrangement for holding the supply paper, loading of the recorder becomes a simple process of placing the new roll of chart paper in the box 100, wrapping the paper around the feed roll 91 which is provided with sprockets 200, feeding the paper over the pressure roll 93 and onto the takeup spool 92. Each side of the chart drive paper has equally spaced holes 156 which are arranged to cooperate with the sprockets 200 on the drive spool 91. Thus, a positive paper drive is provided.

It will be appreciated that while box 100 serves to hold the paper supply roll in the most advantageous manner, other means could possibly be employed. For example, the box 100 can be replaced by means of hinged hubs 100a and 100b attached to the metal sections 90 of the paper carriage assembly. The hubs will support the supply roll 100' at either end of the paper carriage assembly and yet will readily permit the removal of the supply roll simply by swinging the hinges away from the roll when the paper carriage assembly is removed from the recorder. Fig. 21 shows hinged hub 100b in position to permit either the insertion or removal of supply roll 100'.

The assembly including the two arms 106, which are mounted on the front of the recorder, serve also to hold a portion of the cover of the recorder. Attached to the flange of the plate extending between these two arms 106 is a portion of the cover indicated by the numeral 230. Since only the upper or horizontal part of cover 230 is connected to the flange of the plate and the lower end of cover is free, there will be no interference with the deflection of the spring sections.

Figure 4:
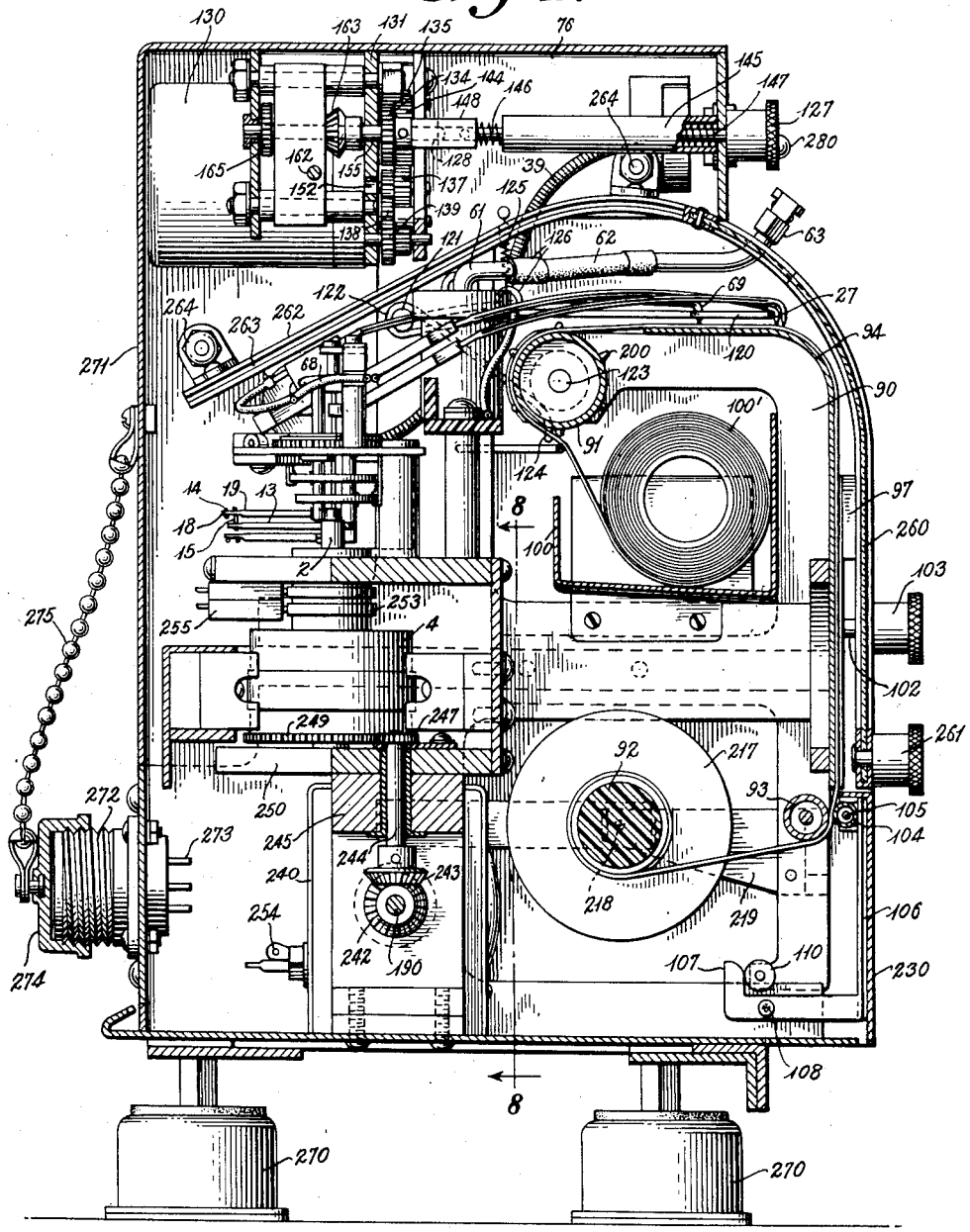
Figure 4 is a view in vertical section of Figure 2 taken along line 4—4.
Figure 8:
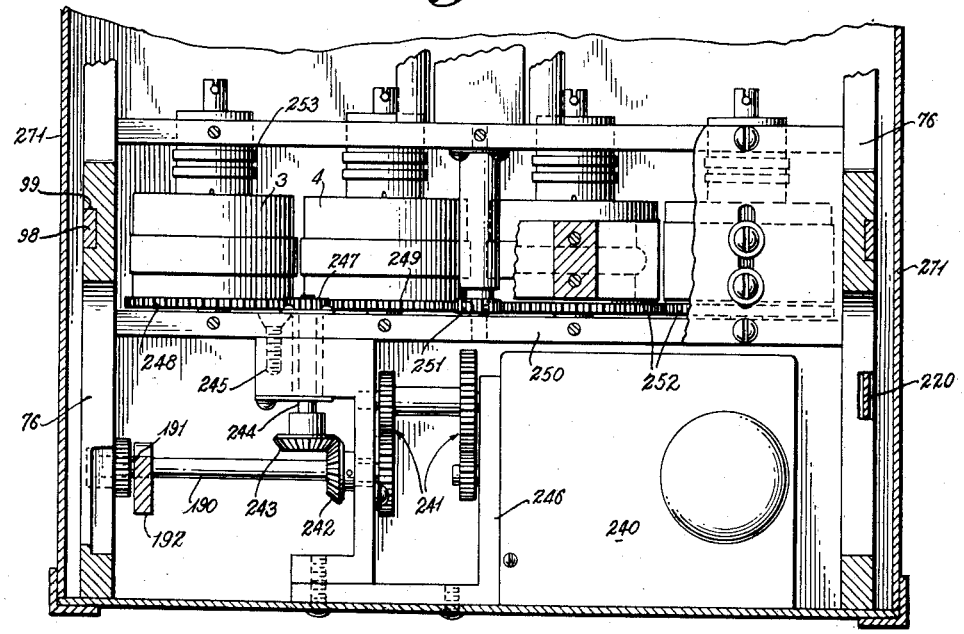
Figure 8 is a view in vertical section of Figure 4 taken along line 8—8.
Figure 10:
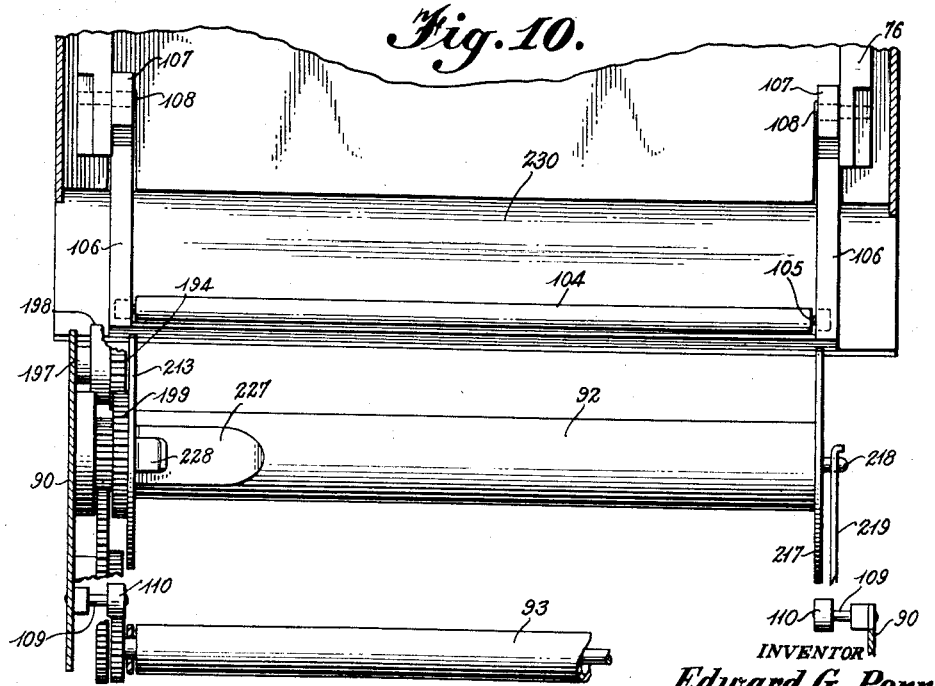
Figure 10 is a view in horizontal section of Figure 9 taken along line 10—10.

The main drive motor 240 is shown in Figs. 4 and 8. The main drive motor 240 connects through suitable reduction gearing 241 with the power take-off shaft 190 upon which is mounted gear 191 of the paper takeup gear train (see Fig. 15). Although the reduction gearing 241 is shown as being composed of a series of spur gears, it will be appreciated that the necessary speed reduction could be accomplished as effectively by the use of worn gearing as by the series of spur gears. Also fixed on shaft 190 is a miter gear 242 meshing with a miter gear 243 fixed to one end of a second power take-off shaft 244. Shaft 244, shaft 190, and reduction gearing 241 are suitably supported by recorder frame pieces 245 and 246. Fixed to the other end of shaft 244 is a spur gear 247 in mesh with gears 248 and 249 mounted on the lower housing sections of clutches 3 and 4. The clutches are supported by plate 250 of the recorder frame. A spur gear 251 carried on a pin fixed in plate 250 connects gear 249 with the meshing gears 252 on the other pair of clutches. At this point it will be noted that the signals to the clutches are supplied through slip ring indicated in Fig. 4 by the numeral 253 and brush electrical contacts 255. Also in Fig. 4 the numeral 254 indicates suitable electrical connections to supply power to motor 240.

A flexible type door 260 with a knob 261 is used with the recorder and is carried in the recessed slot 96 in the flat metal strips 95 attached to the paper carriage assembly. When the paper carriage assembly is to be removed, the door 260 is slid back into the recorder and received in guide strips 262, each with a recessed slot 263 (see Fig. 9). Strips 262 are fixed to the frame 76 of the recorder (see Fig. 4) by suitable means such as screw and lug assemblies 264. Any other type of door can be used in place of flexible door 260, as for example, a rigid door which can be top hung or side hinged. If the door is top hung, the door can swing up and slide back into the recorder case like the flexible door. The necessary guides to accomplish this can be provided.

The recorder is set on resilient mountings 270 which serve to reduce vibration. Also the working parts of the recorder are enclosed by a case 271. The necessary electrical connections to the recorder are made in sockets 272 carried by case 271. The plugs 273 of sockets 272 are appropriately electrically connected internally of the recorder as will be fully appreciated. A cover 274 for each socket 272 is provided and each cover 274 is fastened to the case 271 by a chain 275 to prevent its loss.

The plate 41 on the front of the recorder (see Fig. 1) serves as the control panel. Mounted thereon are the knobs 40 for the zero set adjustment for the recording pens, the knob 127 of the five-speed transmission, an on-off power switch 280 suitably connected with motors 130 and 240, a two position switch 281 connected with timing drive motor 130 to control its direction of rotation, and a knob 282 controlling a lamp on the inside of the recorder for visibility purposes. The switch 281 controlling the direction of rotation of motor 130 enables the chart paper to be driven in inches per minute in one direction of rotation and inches per hour in the other direction. All of the various switches, knobs and sockets are suitably electrically connected to the appropriate parts of the recorder so that each part will perform its intended function. It is understood that the electrical wiring is conventional and within the skill of the art and does not constitute a part of this invention.

While this invention has been shown and described in specific embodiments, nevertheless various changes and modifications obvious to one skilled in the art are within the spirit, scope and contemplation of the present invention.

What is claimed is:

1. A recorder that comprises a frame, a pair of magnetic clutches mounted in said frame and arranged in push-pull, a common element to which the output shafts of said clutches are connected, a shaft, a pin extending axially of said shaft in parallel spaced relation and anchored in said frame, means extending laterally of said pin and hinging said shaft to said pin, said common element connected to said shaft normal to its axis, a recording element connected to said shaft normal to its axis, means to drive said clutches, means to apply signals to said clutches, means adapted to drive a record receiving medium relative to said recording element, and means adapted to feed a recording medium to said recording element whereby said recording element is adapted to mark a record receiving medium with recording medium responsive to signals applied to said clutches.

2. A recorder as defined in claim 1 wherein said recording element consists of a cross arm connected to said shaft normal to its axis, a yoke the legs of which are detachably engaged with the ends of said cross arm and a pen connected to the cross piece of said yoke.

3. A recorder as defined in claim 1 wherein a zero adjustment of said recording element is provided that consists of a ring gear, a spiral spring having one end attached to said shaft and the other fixed to said ring gear, a worm gear in meshing engagement with said ring gear and means to rotate said worm gear.

4. A recorder that comprises a pair of magnetic clutches arranged in push-pull, a common pivoted element to which the output shafts of said clutches are connected, a recording element mounted for pivotal movement, means to transmit the pivotal movement of said common element to said recording element, means to drive said clutches, means to supply signals to said clutches, said recording element provided with a zero adjustment that consists of a spiral spring arranged with the output shaft of each clutch with said springs being wound in opposite directions, the inner end of each said spring being fixed to its respective output shaft and the outer end of each said spring frictionally engaging the mounting of its respective clutch, and means to wind and unwind said springs.

5. A recorder that comprises a pair of magnetic clutches arranged in push-pull, a common pivoted element to which the output shafts of said clutches are connected, a recording element mounted for pivotal movement, means to transmit the pivotal movement of said common element to said recording element, means to drive said clutches, means to supply signals to said clutches, means adapted to drive a record receiving medium relative to said recording element, means adapted to feed a recording medium to said recording element whereby said recording element is adapted to mark a record receiving medium with recording medium responsive to signals applied to said clutches, said recording element provided with a zero adjustment that consists of a spiral spring arranged with the output shaft of each clutch with said springs being wound in opposite directions, the inner end of each said spring being fixed to its respective output shaft and the outer end of each said spring frictionally engaging the mounting of its respective clutch, and means to wind and unwind said springs, wherein said means adapted to feed a recording medium to said recording element includes an ink well, a filler tube connected to the top of said ink well, a breather tube connected to the top of said ink well, a metal tube originating adjacent the bottom of said ink well, extending to the top and outside of said ink well and being curved in a semicircle outside of said ink well, and a flexible tube connecting the outside end of said metal tube with said recording element, said means adapted to feed a recording medium being thus arranged to enable priming of said recording element by temporarily stopping said breather tube while applying pressure to said filler tube and to feed said recording medium to said receiving medium by capillary action.

6. A recorder as defined in claim 1 wherein a time recording assembly is provided adapted to mark the record receiving medium with recording medium, said time recording assembly including a time marking element pivotally mounted, a stop, means urging said time marking element against said stop, electromagnetic means adapted to pivot said time marking element away from said stop, and means to supply time signals to said electromagnetic means to pivot periodically said time marking element away from said stop, and said means adapted to feed a recording medium to said recording element also being adapted to feed recording medium to said time marking element.

7. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly adapted to maintain a record receiving medium relative to said recording element, said carrying assembly being detachably housed in said frame to facilitate replacement of said record receiving medium, common means adapted to drive said clutches and said record receiving medium, and means adapted to feed a recording medium to said recording element whereby said recording element is adapted to mark a record receiving medium with recording medium responsive to signals applied to said clutches.

8. A recorder as defined in claim 7 wherein lifting means are provided to move said recording element out of marking relation with the record receiving medium upon removal of said carrying assembly from said frame.

9. A recorder as defined in claim 8 wherein said lifting means include a substantially U-shaped element anchored on opposite sides of said frame and passing underneath said recording element, said U-shaped element being normally biased to hold said recording element elevated, and said carrying assembly cooperating with said U-shaped element upon being placed in said frame to cause said U-shaped element to lower said recording element.

10. A recorder as defined in claim 7 wherein said carrying assembly includes two side frame elements, a plate connected therebetween functioning as a marking surface, a holding means for record receiving medium, a take-up means for record receiving medium, and a timing drive means.

11. A recorder as defined in claim 10 wherein said take-up means includes a shaft, a spool mounted on said shaft connecting said side frame elements, and a friction clutch mounted between said shaft and said spool to allow slippage therebetween.

12. A recorder as defined in claim 10 wherein said take-up means includes a hub mounted for rotation to each said side frame element, and a spool mounted on and connecting said hubs, said hubs and spool being thus arranged so that slippage of said spool on said hubs is possible.

13. A recorder as defined in claim 10 wherein said holding means includes an open box provided with a sloping, convex bottom.

14. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly including a timing drive spool and take-up means, said carrying assembly being adapted to maintain a record receiving medium in marking relation with said recording element and being detachably housed in said frame to facilitate replacement of said record receiving medium, a main drive motor, gearing means connecting the input shafts of said clutches with the output shaft of said motor, second gearing means connected with the output shaft of said motor, third gearing means mounted on said carrying assembly connected to said take-up means, means to insure the proper meshing of said second and said third gearing means when said carrying assembly is housed in said frame and to prevent binding of said gearing means, and means adapted to feed a recording medium to said recording element whereby said recording element is adapted to mark a record receiving medium with recording medium responsive to signals applied to said clutches.

15. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly including a timing drive spool and a takeup means, said carrying assembly being adapted to maintain a record receiving medium in marking relation with said recording element and being detachably housed in said frame to facilitate replacement of said record receiving medium, a timing motor connected to drive said timing drive spool, a motor connected to drive said clutches and to drive said take-up means at a rate in excess of the drive of said timing drive spool, means to allow slippage of said take-up means, and means adapted to feed a recording medium to said recording element whereby said recording element is adapted to mark a record receiving medium with recording medium responsive to signals applied to said clutches.

16. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly including a timing drive spool and a take-up means, said carrying assembly being adapted to maintain a record receiving medium in marking relation with said recording element and being detachably housed in said frame to facilitate replacement of said record receiving medium, a timing motor, first gearing means connected to said timing motor, second gearing means mounted on said carrying assembly and connected to said timing drive spool, means to insure proper meshing of said gearing means when said carrying assembly is housed in said frame and to prevent binding of said gearing means, a motor connected to drive said clutches and to drive said take-up means at a rate in excess of the drive of said timing drive spool, means to allow slippage of said take-up means, and means adapted to feed a recording medium to said recording element whereby said recording element is adapted to mark a record receiving medium with recording medium responsive to signals applied to said clutches.

17. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly including a timing drive spool and a take-up means, said carrying assembly being adapted to maintain a record receiving medium in marking relation with said recording element and being detachably housed in said frame to facilitate replacement of said record receiving medium, a timing drive motor, a plural speed transmission including a speed selector means connected to said timing drive motor, first gearing means connected to said transmission, second gearing means mounted on said carrying assembly and connected to said timing drive spool, means to insure proper meshing of said gearing means when said carrying assembly is housed in said frame and to prevent binding of said gearing means, a motor connected to drive said take-up means at a rate in excess of the drive of said timing drive spool, means to allow slippage of said take-up means, and means adapted to feed a recording medium to said recording element whereby said recording element is adapted to mark a record receiving medium with recording medium responsive to signals applied to said clutches.

18. A recorder that comprises a frame, a pair of magnetic clutches arranged in push-pull mounted in said frame, a common pivoted element to which the output shafts of said clutches are connected, a recording element, means to transmit the motion of said common element to said recording element, means to supply signals to said clutches, a record receiving medium carrying assembly including a timing drive spool and a take-up means, said carrying assembly being adapted to maintain a record receiving medium in marking relation with said recording element and being detachably housed in said frame to facilitate replacement of said record receiving medium, a timing drive motor, first gearing means connected to said timing drive motor, second gearing means mounted on said carrying assembly and connected to said timing drive spool, a main drive motor, third gearing means connected to said main drive motor, fourth gearing means mounted on said carrying assembly and connected to said take-up means, said gearing means being so constructed and arranged that when said carrying assembly is housed in said frame said first and said second gearing means are in meshing engagement and said third and fourth gearing means are in meshing engagement, and means adapted to feed a recording medium to said recording element whereby said recording element is adapted to mark a record receiving medium with recording medium responsive to signals applied to said clutches.

19. A recorder as defined in claim 18 wherein means are provided with respect to said first and second gearing means to insure proper meshing of said gearing means and to prevent binding of said gearing means.

20. A recorder as defined in claim 18 wherein means are provided with respect to said third and fourth gearing means to insure proper meshing of said gearing means and to prevent binding of said gearing means.

21. A recorder as defined in claim 18 wherein said main drive motor drives said take-up means at a rate in excess of the drive of said timing drive spool and means are provided to allow slippage of said take-up means.

22. A recorder as defined in claim 18 wherein a plural speed transmission including a speed selector means connects said timing drive motor with said first gearing means.

23. A recorder that comprises a frame, a pair of magnetic clutches arranged in push-pull mounted in said frame, a common element to which the output shafts of said clutches are connected, a recording element, means to transmit the motion of said common element to said recording element, means to apply signals to said clutches, a record receiving medium carrying assembly including a timing drive spool, a take-up means and a pressure roller, said carrying assembly being adapted to maintain a record receiving medium in marking relation with said recording element and being detachably housed in said frame, L-shaped means pivotally attached to said frame, a pressure roller mounted on the end of one leg of said L-shaped means, said carrying assembly and L-shaped means cooperating so that during placement of said carrying assembly in said frame said carrying assembly contacts the other leg of said L-shaped means causing same to pivot until said rollers are bearing against each other, a main drive motor, gearing connecting said main drive motor to said clutches and said take-up means, a timing drive motor, gearing connecting said timing drive spool to said timing drive motor, and means adapted to feed a recording medium to said recording element whereby said recording element is adapted to mark a record receiving medium with recording medium in response to signals applied to said clutches.

24. A recorder as defined in claim 14 wherein said means to insure the proper meshing of said second and said third gearing means when said carrying assembly is housed in said frame and to prevent binding of said gearing means further functions to maintain constant the speed of said timing drive spool.

25. A recorder as defined in claim 19 wherein said means provided with respect to said first and second gearing means to insure proper meshing of said gearing means and to prevent binding of said gearing means further functions to maintain constant the speed of said timing drive spool.

26. A recorder that comprises a frame, a pair of magnetic clutches arranged in push-pull mounted in said frame, a common element to which the output shafts of said clutches are connected, a recording element, means to transmit the motion of said common element to said recording element, means to apply signals to said clutches, a record receiving medium carrying assembly including a timing drive spool, a take-up means and a first pressure roller, said carrying assembly being adapted to maintain a record receiving medium in marking relation with said recording element and being detachably housed in said frame, a second pressure roller mounted to contact said first pressure roller and to receive said record receiving medium therebetween, a main drive motor, gearing connecting said main drive motor to said clutches and to said take-up means, a timing drive motor, gearing connecting said timing drive spool to said timing drive motor, and means adapted to feed a recording medium to said recording element whereby said recording element is adapted to mark said record receiving medium with recording medium in response to signals applied to said clutches.

27. A recorder as defined in claim 10 wherein said timing drive means includes a timing motor, a multispeed transmission and gearing means to control the speed of said record receiving medium.

References Cited in the file of this patent

UNITED STATES PATENTS

| | | |
|---|---|---|
| 1,316,658 | White et al. | Sept. 23, 1919 |
| 1,708,900 | Roller | Apr. 9, 1929 |
| 1,873,926 | Centeno | Aug. 23, 1932 |
| 1,886,844 | Spitzglass | Nov. 8, 1932 |
| 2,176,777 | Tate | Oct. 17, 1939 |
| 2,181,728 | Greentree | Nov. 28, 1939 |
| 2,262,958 | Offner | Nov. 18, 1941 |
| 2,508,410 | Lunas | May 23, 1950 |
| 2,594,136 | Di Maggio | Apr. 22, 1952 |
| 2,651,754 | Perry et al. | Sept. 8, 1953 |
| 2,663,609 | Jones | Dec. 22, 1953 |
| 2,669,501 | Young et al. | Feb. 16, 1954 |
| 2,724,631 | Ruhland | Nov. 22, 1955 |